A. F. ENGLERTH.
HAND PROPELLED VEHICLE.
APPLICATION FILED MAR. 26, 1917.
1,236,696.
Patented Aug. 14, 1917.
2 SHEETS—SHEET 1.
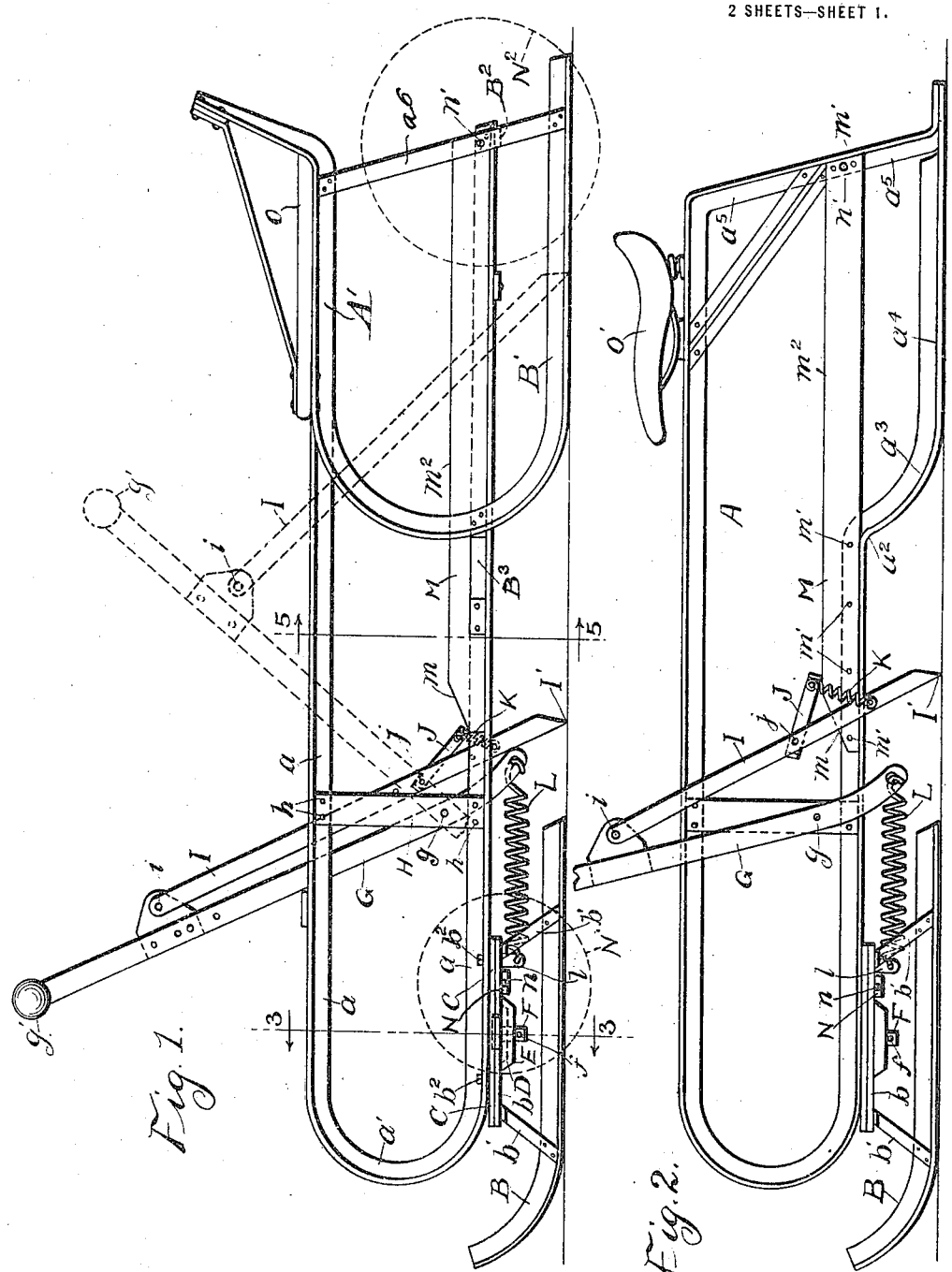
WITNESSES:
E. D. Jacker
INVENTOR
Anton F. Englerth,
BY
Charles Turner Brown,
ATTORNEY

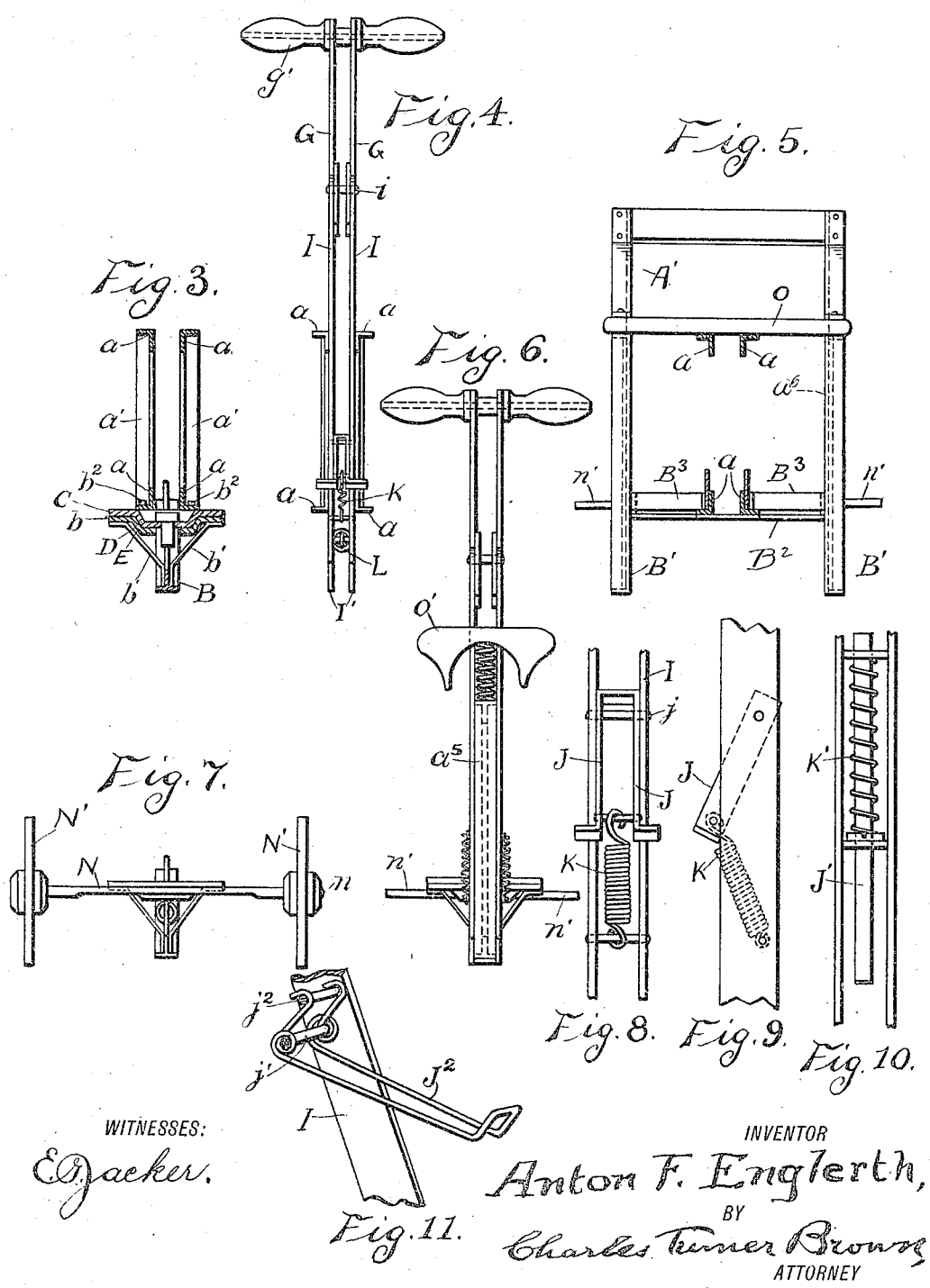

UNITED STATES PATENT OFFICE.

ANTON F. ENGLERTH, OF CHICAGO, ILLINOIS.

HAND-PROPELLED VEHICLE.

1,236,696.　　　　　Specification of Letters Patent.　　Patented Aug. 14, 1917.

Application filed March 26, 1917.　Serial No. 157,377.

*To all whom it may concern:*

Be it known that I, ANTON F. ENGLERTH, a subject of the King of Hungary, and a resident of the city of Chicago, in the county of Cook and State of Illinois, have invented certain new and useful Improvements in Hand-Propelled Vehicles, of which the following is a specification.

This invention particularly relates to the frame and propelling means of the vehicle.

And the objects of the invention are to obtain a vehicle which is easily convertible from one traveling on runners to one traveling on wheels: a vehicle whereof the frame is simple and economical in construction: and well adapted for single or double runners or wheels.

Further objects are to obtain propelling means operable by the hands of a person seated on the vehicle which consist of few parts, easily actuated and effective in operation.

I have illustrated a device embodying this invention in the drawings accompanying and forming a part of this specification, in which—

Figure 1, is a side view representing the device mounted on runners, with the position of attachable wheels indicated by circles in broken lines.

Fig. 2, is a side view representing the device provided with single runners.

Fig. 3, is a sectional view on line 3—3 of Fig. 1, viewed in the direction indicated by the arrows.

Fig. 4, is an end elevation representing the frame of the device, the operable handle, and adjacent parts.

Fig. 5, is a section on line 5—5 of Fig. 1, viewed in the direction indicated by the arrows.

Fig. 6, represents a rear view of the single runner sled which is illustrated in side elevation in Fig. 2.

Fig. 7, is an elevation representing a portion of the front runner of the device with vehicle wheels mounted on the ends of the steering cross-bar thereof.

Fig. 8, represents a front view of a lifter forming an element of the device, a portion of the frame and of the propelling lever, and a connecting spring.

Fig. 9, represents a side view of said lifter, a portion of the propelling lever, and the connecting spring.

Fig. 10, is a front elevation of a modification of the lifter and spring, and of a portion of the propelling lever; and Fig. 11, represents a perspective of an additional modification of said lifter and also of a portion of the propelling lever.

A reference character applied to designate a given part indicates said part throughout the several figures of the drawing, wherever the same appears.

A, represents the main frame of the device and, when said vehicle is provided with widely separated double runners, or vehicle wheels, it extends longitudinally midway of the sides.

Frame A, consists of parallel angle iron bars which are respectively bent as at $a^1$ with the straight sides of each thereof being parallel and in vertical planes (lettered $a$).

$a^6$ is a brace member in frame $A^1$ extending upward from near the rear end of runner $B^1$ to the upper horizontal member of said frame $A^1$.

When the device is provided with rear runners, as in Fig. 2, said runners not being widely separated, the lower members ($a$) of frame A are respectively bent as at $a^2$ and curved as at $a^3$ to obtain the horizontal positions $a^4$ of the frame, which portions ($a^4$) form said runners. In this construction the upper horizontal member of the frame is bent downward at its rear end to obtain the member $a^5$, which corresponds with the brace member $a^6$ of the frame $A^1$.

In this construction, (illustrated in Fig. 2,) provision is made for attaching vehicle wheels to said frame A.

B, is the front runner of the device and is provided with plate $b$ arranged to form a platform which is secured to said runners by standards or braces $b^1$.

C, is a plate which is secured to the lower horizontal members $a$ of the frame A, as by bolt $b^2$, said plate resting on plate platform $b$ which forms the support of the forward end of the frame.

The runner B is pivotally attached to the frame A and said pivotal attachment comprises the depressed annular portion D of plate C which fits in the correspondingly annular depressed portion E of the platform plate $b$, and the bolt F, which extends through said plates and pin $f$ in said bolt F.

The propelling member consists of the lever G which is pivoted at $g$ between the vertical members H (said vertical members being secured to the parallel portions $a$ of frame A by bolts or rivets $h$); the push bar I which is pivotally secured to lever G by pin or bolt $i$; the lifter J, and springs K and L. Lever G is provided with handle $g^1$.

The lifter J is pivotally attached to push bar I by bolt $j$, and the spring K is attached at its ends to said lifter J and said push bar I.

The spring L is attached at one end to the lever G and at the other end to the abutment $l$, said abutment being rigidly secured to runner B.

M, is a horizontal bar provided with inclined face $m$, at the forward end thereof. Bar M is rigidly secured to frame A by means of the rivets or bolts $m^1$.

The purpose of the bar M is to raise the free end of lifter J and maintain it in said raised position in the operation of the device, and said bar is hereinafter termed the cam bar. In Fig. 1, the operating lever G and push bar I are illustrated in their extreme forward positions, with spring K connecting push bar I and lifter J retracted, and in Fig. 2, said lever G and push bar I are illustrated with the upper end of said lever turned on its pivot $g$ a short distance to the right from the position in which it is illustrated in Fig. 1 and the free end of the lifter J raised by movement thereof on the inclined face $m$ of cam bar M. Further movement to the right of handle $g^1$ of said lever G produces continued forward movement of the device, (propelling said device) and a relative movement of the free end of lever J and the upper face, $m^2$, of cam bar M; so that said end of lever J slides on said upper face of the cam bar, maintaining spring K extended.

Spring K being extended, so soon as propelling bar I ceases to propel the device the end $I^1$ of said propelling bar is raised by said spring, and is maintained in a raised position so long as the free end of lifter J is on the horizontal face $m^2$ of cam bar M, whether said free end is at rest on said face, or is moved to the left thereon by the movement of lever G to its initial position, (as illustrated in Fig. 1).

Spring L is extended when the lever G is in its initial position, as represented in Fig. 1, and as the upper end of said lever is moved to the right, on its pivot $g$, the spring retracts, assisting in the propulsion of the device. After a driving or propelling movement of the lever G and propelling bar I is completed, (by the movement of the upper end of lever G to the right), the said lever and propelling bar are returned to their initial positions by moving the upper end of the lever G to the left, (as viewed in Figs. 1 and 2), to the position illustrated in Fig. 1, and the movement of said lever G to the left extends and puts under tension, said spring L. Said spring, therefore, tends to equalize the force required to move the upper end of the lever to the right and to the left; tends to hold the runner B in line with the rear runners of the device, and also, tends to hold the forward end of the device to the surface over which the device is being propelled.

N is a bar which is secured to runner B to extend transversely thereto and is adapted to form a support for the feet of the person using the device and to form a steering bar. The ends of the steering bar N are provided with the axles $n$ (Figs. 1, 2, and 7) on which the wheels $N^1$ are rotatably mountable.

In Fig. 5, the frame $A^1$, which I term a sub-frame, comprising runners $B^1$, and cross bars $B^2$, $B^3$ is secured to frame A, and axles $n^1$ are secured to members $a^6$ of said sub-frame (see Figs. 1 and 5). Wheels $N^2$ are rotatably mounted on axles $n^1$ (wheel $N^2$ being indicated by broken lines in Fig. 1). When the rear vehicle wheels of the device are not desired to be widely separated, laterally, the projections forming axles $n^1$ are attached to the downwardly extending member $a^5$ of frame A (see Fig. 2).

O, represents a seat (Fig. 1) and $O^1$, (Figs. 2 and 6) represent a saddle.

It is evident that the lifter J and spring K is not restricted to the construction which is illustrated in Figs. 1, 2, 8 and 9, and a modification of said lifter and spring is illustrated in Fig. 10, lettered respectively $J^1$ and $K^1$. An additional modification of the lifting lever is illustrated in Fig. 11 where said lever (lettered $J^2$) is made of resilient material, and attached to push bar I, as by bolts or projections $j^1$ $j^2$.

The spring L is illustrated as attached to the lever G and to the abutment $l$ on the pivotally attached runner B so that said spring may perform the function of tending to turn said lever on its pivot and also as yieldingly holding the runner B in line with runner $B^1$.

When this double function of spring L is not desired the end of said spring which is illustrated as attached to abutment $l$ may be attached to frame A.

I claim:

1. A hand propelled vehicle consisting of a frame extending longitudinally of said vehicle in combination with a driving mechanism mounted on said frame, said mechanism comprising a pivotally mounted lever and a push bar pivotally mounted on said lever, and yielding means tending to raise the engaging end of said push bar when said push bar is in an engaged position and propelling said vehicle.

2. A hand propelled vehicle comprising a frame containing parallel bars extending longitudinally of said vehicle, in combination with a driving mechanism mounted on said frame, said mechanism comprising a lever pivotally mounted between said parallel bars and a push bar pivotally mounted on said lever, with yielding means tending to raise the engaging end of said push bar when said push bar is in an engaged position and propelling said vehicle.

3. A hand propelled vehicle comprising a frame containing parallel bars in combination with a driving mechanism mounted on said frame, said mechanism comprising a lever pivotally mounted between said parallel bars and a push bar pivotally mounted on said lever, with yielding means tending to raise the engaging end of said push bar when said push bar is in an engaged position and propelling said vehicle, said yielding means comprising a lifter, means yieldingly connecting said push bar and lifter, and means to automatically put said connecting means under tension on a determined pivotal movement of said lever from its initial position.

4. A hand propelled vehicle comprising a frame containing parallel bars, and an additional frame arranged to support one end of said first named frame and pivotally attached thereto, in combination with a driving mechanism mounted on said first named frame, said mechanism comprising a lever pivotally mounted between said parallel bars, a push bar pivotally mounted on said lever, with yielding means tending to raise the engaging end of said push bar when said push bar is in an engaged position and propelling said vehicle, and a yielding connection attached to said lever and said additional frame.

5. A hand propelled vehicle comprising a frame containing parallel bars extending longitudinally of said vehicle, in combination with a driving mechanism mounted on said frame, said mechanism comprising a lever pivotally mounted between said parallel bars and a push bar pivotally mounted on said lever, said lever alternately movable in a propelling and a return travel, with yielding means tending to raise the engaging end of said push bar when said push bar is in an engaging position and propelling said vehicle, and means to transmit thereto, on the propelling travel of said lever, force applied to said lever on its return travel.

6. In a hand propellable vehicle a frame comprising parallel members, the rear ends of the lower ones of said members arranged to form runners and a lever mounted on said frame and movable in a propelling and a return travel, in combination with additional runners rotatably attached to the forward end of said frame, and a spring connection between said forward runners and said lever, said connection arranged to increase the tension of said spring on the return travel of said lever and to correspondingly decrease said tension and transmit energy thereby to said lever on the propelling travel thereof, and also adapted to yieldingly maintain said forward and rear runners in line.

7. In a hand propellable vehicle, a frame, a lever pivotally mounted on said frame and a push bar pivotally mounted on said lever, said lever alternately movable in a propelling and return travel, in combination with a spring, means to hold one end of said spring substantially stationary, and means to attach the other end thereof to said lever, said spring arranged to receive energy applied thereto on the return travel of said lever, and to transmit said energy to said lever on the propelling travel thereof.

8. A hand propelled vehicle comprising a frame containing parallel bars extending longitudinally of said vehicle, in combination with a driving mechanism mounted on said frame, said mechanism comprising a lever pivotally mounted between said parallel bars and a push bar pivotally mounted on said lever and between said parallel bars, with yielding means tending to raise the engaging end of said push bar when said push bar is in an engaging position and propelling said vehicle, and means to receive and store energy applied on the return travel of said lever and to apply said energy to said lever on the propelling travel thereof, said storage means comprising a connection between said forward runners and said lever adapted to yieldingly maintain said forward and rear runners in line.

9. In a hand propelled vehicle a frame, runners rigidly attached to said frame, and a propelling lever pivotally mounted on said frame, said lever extending below the pivot thereof, in combination with an additional runner pivotally attached to said frame and a yielding connection attached to said additional runner and to said lever, below the pivot thereof.

ANTON F. ENGLERTH.

In the presence of—
CHARLES TURNER BROWN,
SOFUS J. CHRISTENSEN.

Copies of this patent may be obtained for five cents each, by addressing the "Commissioner of Patents, Washington, D. C."